United States Patent [19]
Nishimura et al.

[11] Patent Number: 6,034,773
[45] Date of Patent: Mar. 7, 2000

[54] LENGTH MEASURING MACHINE AND METHOD USING LASER BEAMS

[75] Inventors: Kunitoshi Nishimura; Morimasa Ueda; Kiyokazu Okamoto, all of Tsukuba, Japan

[73] Assignee: Mitutoyo Corporation, Kawasaki, Japan

[21] Appl. No.: 09/168,967

[22] Filed: Oct. 9, 1998

[30] Foreign Application Priority Data

Oct. 16, 1997 [JP] Japan ................................. 9-283254

[51] Int. Cl.$^7$ ...................................................... G01B 9/02
[52] U.S. Cl. ............................ 356/358; 356/345; 356/361
[58] Field of Search ................................... 356/356, 358, 356/345, 361

[56] References Cited

U.S. PATENT DOCUMENTS 5,141,318  8/1992  Miyazaki et al. .
5,483,343  1/1996  Iwamoto et al. ...................... 356/361

FOREIGN PATENT DOCUMENTS

0182394 A2  5/1986  European Pat. Off. .

*Primary Examiner*—Robert H. Kim
*Attorney, Agent, or Firm*—Oliff & Berridge, PLC

[57] ABSTRACT

There is provided a length measuring machine which is not influenced by fluctuations of air or changes in temperature. At a structure, graduations are formed in a longitudinal direction, and further a built-in light wave interferometer is provided. The built-in light wave interferometer measures a length of the structure and supplies the data to a current controller. In order to reconcile a length of the structure with a nominal value, the current controller supplies current to an electrical resistor provided at the structure to cause thermal expansion of the structure, or the structure is cooled.

17 Claims, 12 Drawing Sheets

LENGTH MEASURING MACHINE AND METHOD USING LASER BEAMS

BACKGROUND OF THE INVENTION

1. Field of the Invention

The present invention relates to both a ultra high precision length measuring machine utilizing laser beams which has a constitution such that graduations are marked on a physical medium in a longitudinal direction and controls the influence of a change with the passage of time or a working environment and a length measuring method.

2. Description of the Related Art

Heretofore, there have been two types of measuring instruments: one uses a length measuring machine; the other uses laser beams. In the case of length measurement using the length measuring machine, it is possible to perform stable measurement even while the length measuring machine is travelling in the air, but it has the following disadvantages.

(1) A physical medium is influenced by environmental temperature and therefore a part on which graduations are marked changes in length. For example, in the case of a steel medium, a precision decreases by 11.8 $\mu$m/m° C.

(2) In the case of a physical medium, the length of the part on which the graduations are marked becomes uneven when the medium is in a vertical position even though external force (gravitation) is stable. Thus, the precision decreases.

(3) The physical medium has a tendency to expand and contract with the passage of time. Thus, even though heat resistance glass which is insensitive to variations in temperature, for example, ZERO DURE MATERIAL(brand name) is used, the length changes in a longitudinal direction by 30 to 70 nm/m per year with the passage of time. This is equivalent to about 0.3 to 0.7 $\mu$m/m in ten years which is a significant value.

On the other hand, in the case of a gage interferometer using laser beams, a physical property of laser beams to stabilize a wave length is demonstrated as it is in a vacuum, thereby enabling highly accurate length measurement. However, in the air, the gage interferometer is easily influenced by a fluctuation of air (fluctuation of refractive index). Thus, there is a limit in controlling an environmental influence, especially when the measurement is performed while travelling. Measuring instruments are usually used in a space in which air exists. It is reported that under such circumstances, slight movement of 2 $\mu$m in an optical path length of about 1 meter leads to a fluctuation of measured data of about 2 $\mu$m due to the influence of a fluctuation of air resulting from travelling of a material body. Thus, although a system which always makes corrections of the fluctuation of air extending over a whole optical path using laser beams of two wave lengths having very different frequencies has been put to practical use, the fluctuation of measured data can be controlled up to at most about ±0.01 $\mu$m when the material body is at a standstill.

As described above, measurement using a length measuring machine or laser beams has a disadvantage, and therefore it is very difficult to perform stable and high resolution measurement of about 0.1 nm or 1 nm in a length measuring interval in the order of 1 meter, especially measurement of the location of a travelling object under ordinary circumstances (under the circumstances in which air exists).

SUMMARY OF THE INVENTION

The object of the present invention is to provide a length measuring machine which has high resolution and precision almost the same as those of a laser beam wave interferometer provided in a vacuum, can be used under ordinary circumstance, and can perform stable measurement of a travelling object.

In order to achieve the object described above, a length measuring machine according to the present invention comprises a structure which brings about uniform thermal expansion in a longitudinal direction, graduations to be provided on a wall surface of the structure, a light wave interferometer for measuring a length of a part on which the graduations are provided, and temperature control means for changing a temperature of the structure based on the length measured by the light wave interferometer. A true value of the length measuring machine is measured with a high precision using the light wave interferometer. Based on a result of the measurement, the structure is made to expand and contract by adjusting the temperature of the structure so as to reconcile a nominal value with a true value. Thus, the influence of a change with the passage of time or a working environment upon the length measuring machine is eliminated, whereby it is possible to perform highly precise measurement under an ordinary environment.

Here, it is preferable that the structure has a closed hollow section decompressed nearly to a vacuum or contains within it a substance which has a uniform refractive index and is permeable by laser beams.

Also preferably, the present invention has temperature detecting means for detecting a temperature of the structure, wherein the laser beams have a wave length such that a difference between a length measured by the light wave interferometer and a nominal value becomes a phase difference within a range of one wave length when the temperature of the structure detected by the temperature detecting means is within a prescribed range.

Further, the present invention preferably has computing means for correcting intervals between the graduations based on a temperature distribution of the structure detected by the temperature detecting means. More precise length measurement is possible using temperature correction of intervals between the graduations.

DESCRIPTION OF THE PREFERRED EMBODIMENTS

An embodiment of the present invention will subsequently be described with reference to the accompanying drawings.

First Embodiment

Figure 1:
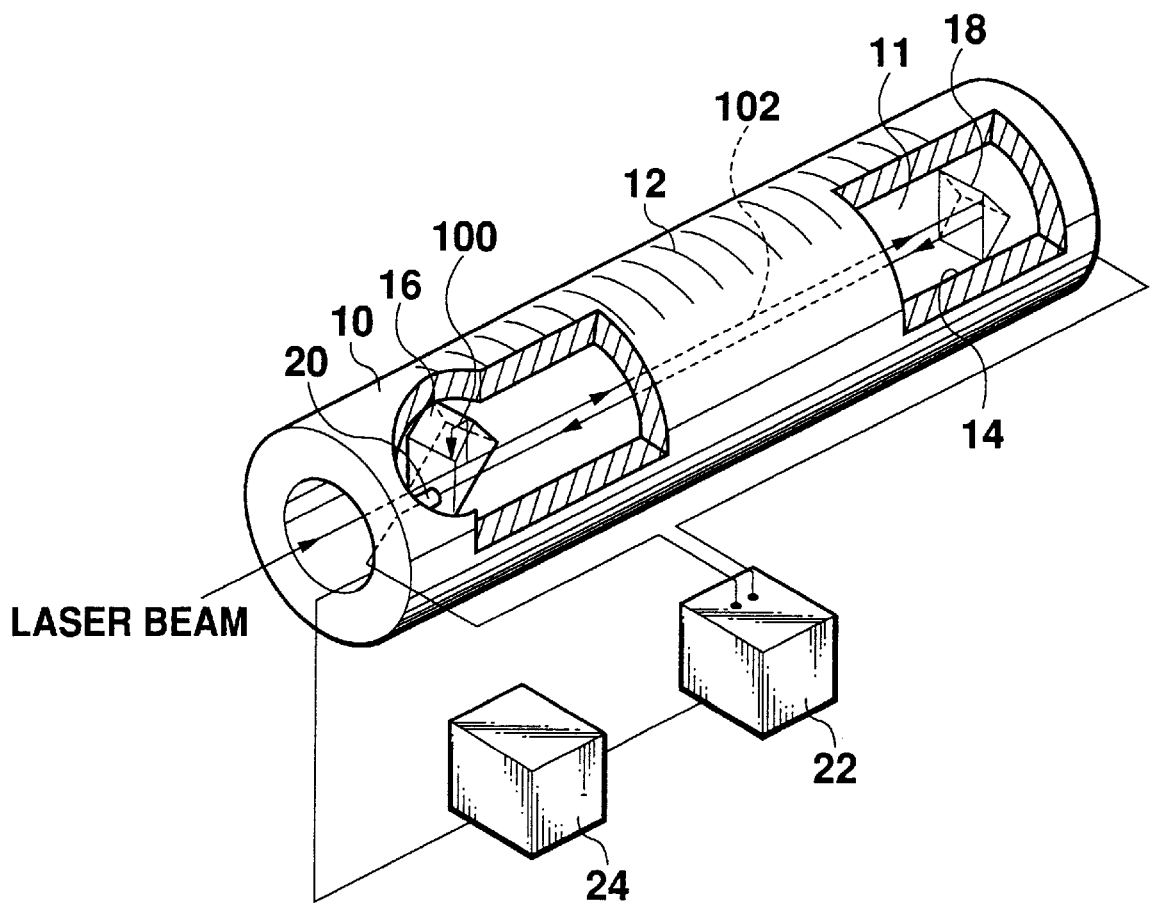
FIG. 1 is a perspective view showing a length measuring machine according to a first embodiment of the present invention.

FIG. 1 is a perspective view showing a length measuring machine using laser beams according to this embodiment. This length measuring machine brings about uniform thermal expansion in a longitudinal direction and is composed of a structure 10 having a closed hollow section which is decompressed almost to a vacuum. At an external wall of the structure 10, graduations 12 are marked in a longitudinal direction. "Almost to a vacuum" means a vacuum which can practically ignore the influence of fluctuation of air upon laser beams. It does not always mean a complete vacuum.

Further, at an inner wall of the closed hollow section of the structure 10, electrical resistors 14 which uniformly generate heat in a longitudinal direction in response to applied current are sequentially formed. In the closed hollow section, there is provided a light wave interferometer for measuring a length of the section of graduations 12 provided at the external wall of the structure 10. This light wave interferometer is composed of a beam splitter 16 for separating an optical path of incident laser beams into a reference branch optical path 100 and a signal branch optical path 102; a corner cube 18 for reflecting the signal branch optical path 102; and an optical path difference detector 20 for detecting an optical path difference between the reference branch optical path 100 and the signal branch optical path 102. Further, a controllable electrical source 22 and a current controller 24 for supplying current to the electrical resistors 14 are provided outside the structure 10.

The structure 10 can be made of single crystal silicon or the like, for example, and can be formed by applying deep hole processing (gun drill, grinding or the like) to a lengthy single crystal silicon substance. Further, the electrical resistors 14 can be formed by evaporation, sputtering, or the like of a metal such as tungsten, for example. The electrical resistors 14, the controllable electrical source 22, and the current controller 24 function as temperature control means.

Figure 2:
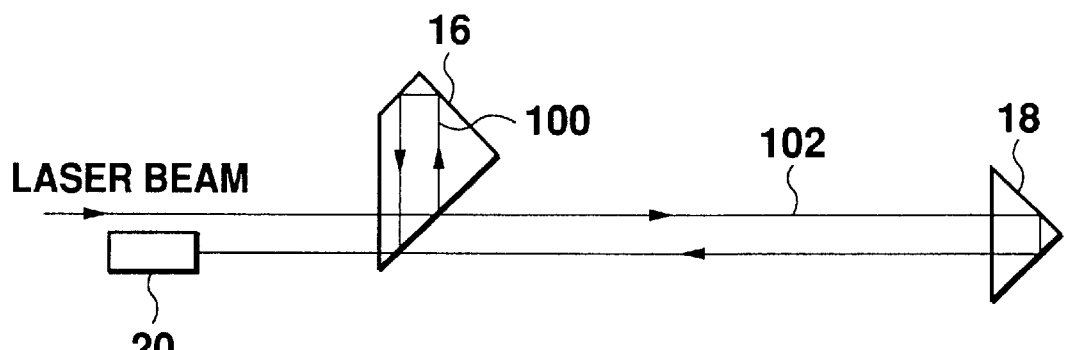
FIG. 2 is a block diagram showing the light wave interferometer of FIG. 1.

FIG. 2 shows the constitution of the light wave interferometer to be provided in the closed hollow section of the structure 10. Incident laser beams enter into the beam splitter 16. On the surface, these laser beams are then separated into two groups: one advance along the reference branch optical path 100 and the other advances along the signal branch optical path 102. The laser beams advancing along the reference branch optical path 100 repeat reflection in the beam splitter 16 and enter into the optical path difference detector 20. On the other hand, the laser beams advancing along the signal branch optical path 102 penetrate through the beam splitter 16, and then enter into the corner cube 18. Subsequently, these laser beams are reflected at the corner cube 18, enter into the beam splitter 16 again, and enter into the optical path difference detector 20.

Here, the beam splitter 16 is provided at a location which corresponds to one end of the graduations 12 provided at an external wall of the structure 10. On the other hand, the corner cube 18 is provided at a location which corresponds to the other end of the graduations 12. Thus, an optical path difference between the reference branch optical path 100 and the signal branch optical path 102 corresponds to an interval between one end and the other end of the graduations 12. Consequently, by detecting the optical path difference between the reference branch optical path 100 and the signal branch optical path 102 using the optical path difference detector 20, it is possible to measure an interval between one end and the other end of the graduations 12, namely, a true value of the length of the section on which the graduations 12 are marked.

If a phase difference between both optical paths is detected as the strength of interference light, for example, using a homodyne method, an optical path difference can be detected.

Figure 3:
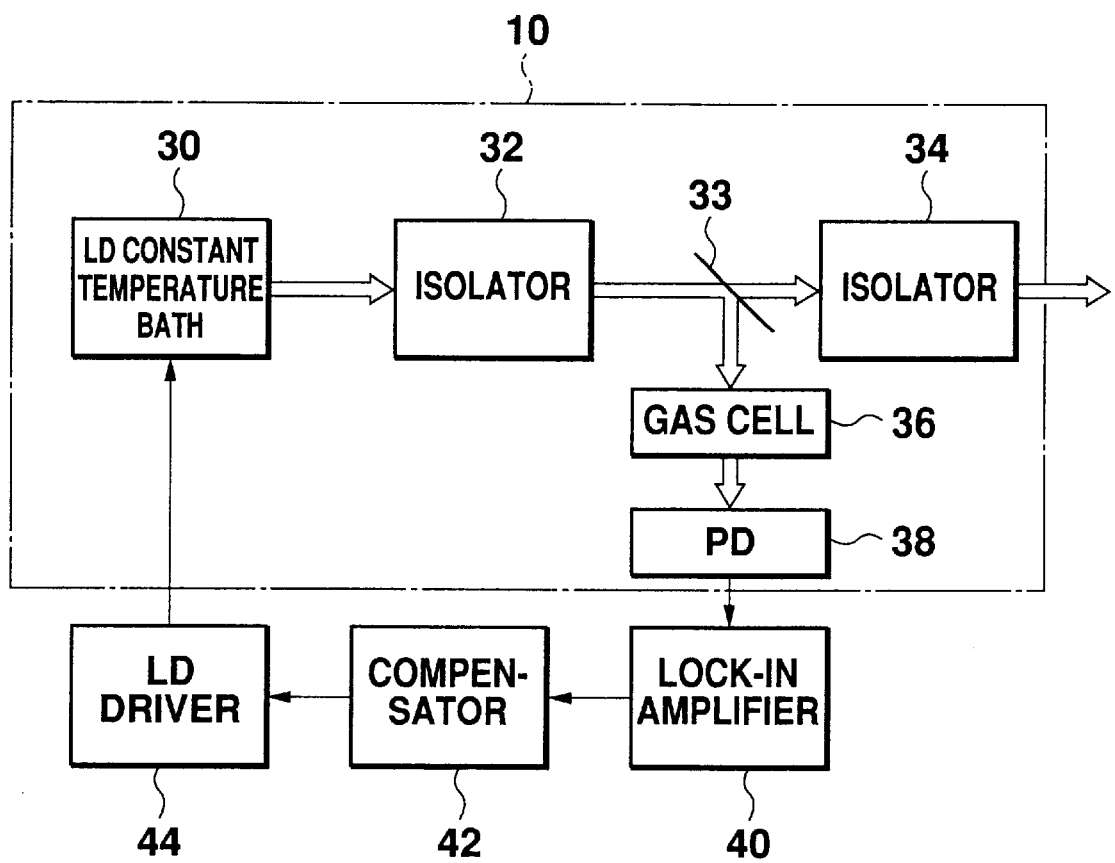
FIG. 3 is a block diagram of a laser beam source.

FIG. 3 shows an example of laser beam sources for supplying laser beams to be used in the light wave interferometer. A laser diode (LD) can be used as a laser beam source. The laser diode is provided in an LD constant temperature bath 30, whereby its temperature is maintained constant. Laser beams injected from the laser diode enter into a beam splitter 33 via an isolator 32. The isolator 32 is for stabilizing operation of the laser diode by preventing the incidence of return beams into the laser diode. Laser beams which have entered into the beam splitter 33 are separated into two groups. The laser beams which have penetrated through the beam splitter 33 enter into the beam splitter 16 or the corner cube 18 via the isolator 34. Like the isolator 32, the isolator 34 is also for stabilizing operation of the laser diode by preventing the incidence of return beams into the laser diode.

On the other hand, laser beams which have reflected at the beam splitter 33 enter into a gas cell 36. The gas cell 36 is a cell in which gasses having a specified absorption line are sealed and damps only beams having specified frequencies outputs of the gas cell 36 are supplied to a photo diode (PD) 38 and converted into electrical signals. Thus, laser beams are taken out as signals whose specified frequencies have only been damped a little bit by the gas cell 36. Signals from the photo diode 38 are supplied to a lock-in amplifier 40.

By the use of synchronous detection, the lock-in amplifier 40 takes out only outputs having specified frequencies and supplies the outputs to a compensator 42.

Like a PID controller or the like which is used in a feedback loop, the compensator 42 is for improving closed loop characteristics (responsibility, stability or the like), and outputs from the compensator 42 are supplied to an LD driver 44.

The LD driver 44 generates LD drive signals modulated with a certain frequency and supplies the signals to the laser diode in the LD constant temperature bath. Thus, it is adjusted so that emission frequencies of the laser diode become constant.

The LD constant temperature bath 30, the isolator 32, the beam splitter 33, the isolator 34, the gas cell 36, and the photo diode 38 can be arranged in the closed hollow section of the structure 10.

The length measuring machine according to the embodiment has the constitution described above and functions as follows. More specifically, first, a length of the part on which the graduations 12 are marked is measured by the optical path difference detector 20 of the light wave interferometer provided in the closed hollow section of the structure 10. It goes without saying that in order to measure an optical path difference, laser beams used must have a wave length which is within a range of one wave length of a phase difference to be detected by the optical path difference detector 20. Also, a measured value (specifically, data about an optical path difference between the reference branch optical path 100 and the signal branch optical path 102) is supplied from the optical path difference detector 20 to the current controller 24, so that a difference between a nominal value of the length measuring machine and the measured value is computed. This difference is caused by the influence of a change with the passage of time or a working environment (expansion and contraction of a medium resulting from a fluctuation of temperature). In order to eliminate the difference between the nominal value and a true value, the current controller 24 supplies control signals to the controllable electrical source 22, and current corresponding to a quantity of the difference is supplied to the electrical resistor 14 to uniformly heat the structure 10 in a longitudinal direction.

As described above, even though the structure 10 expands and contracts due to the influence of a change with the passage of time or a working environment, a degree of the expansion and contraction can be precisely measured and a length of the section of the graduations 12 of the structure 10 can be reconciled with a nominal value, thereby enabling highly precise length measurement.

In the above description, a case in which a true value is reconciled with a nominal value by supplying current to the electrical resistor 14 to cause thermal expansion of the structure 10 is shown. However, since the major point of the present invention is to reconcile a true value with a nominal value by controlling a temperature of the structure 10, such a reconciliation can also be achieved by cooling the structure 10 using cold water, low temperature gas, or the like other than heating the structure 10. Specifically, if a nominal value is larger than a true value, thermal expansion will be applied, and if a true value is larger than a nominal value, expansion and contraction by cooling will be applied.

Further, in the embodiment described above, electrical resistors 14 are uniformly (sequentially) formed at an inner wall of the closed hollow section of the structure 10. However, a plurality of terminals for turning on electricity are fitted to the electrical resistors formed in the closed hollow section in a longitudinal direction, thus making it also possible to specify areas to be heated by properly selecting areas to which current is applied.

Figure 4:
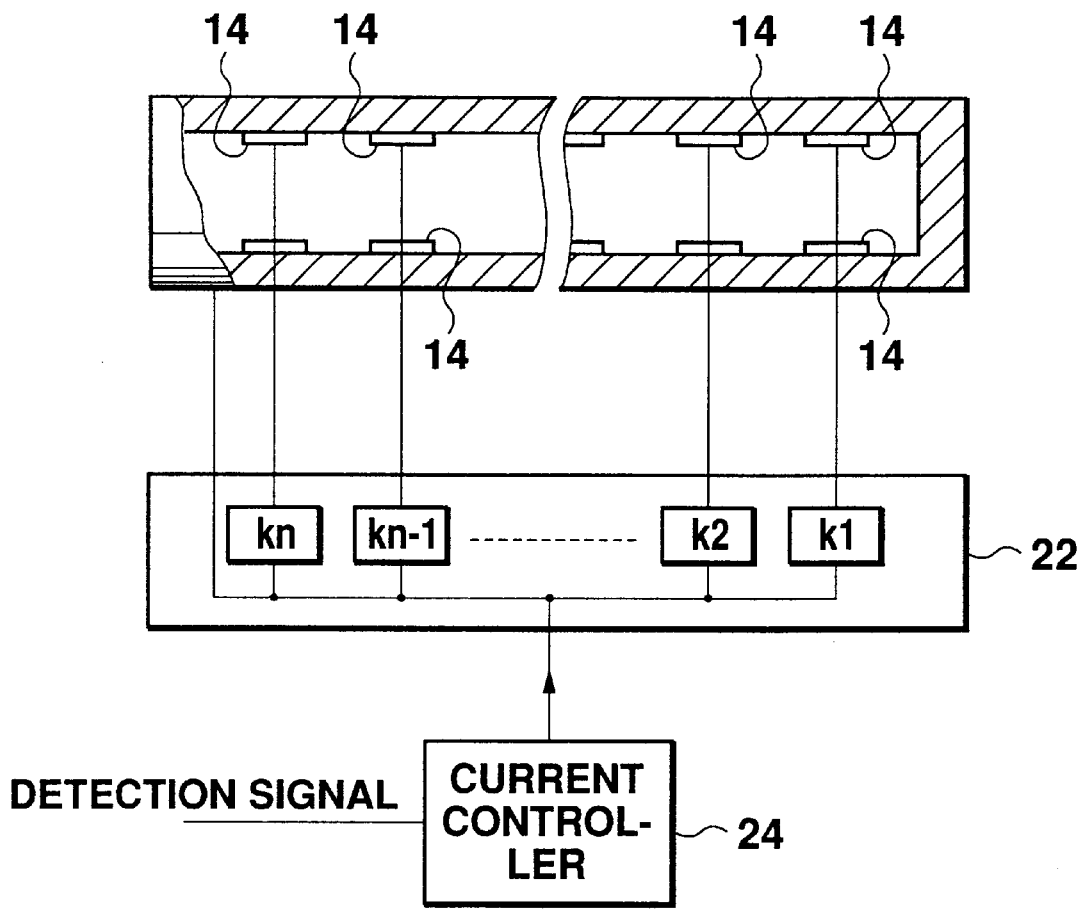
FIG. 4 is an explanatory view showing an arrangement of an electrical resistor and a current carrying element.

FIG. 4 shows the constitution for the case described above. The electrical resistors 14 are formed in the closed hollow section of the structure 14 in the form of a ring at prescribed intervals, and the respective electrical resistors 14 are connected with terminals for turning on electricity k1, k2 ... kn. The terminals for turning on electricity k1, k2 ... are provided in the controllable electrical source 22. When a detection signal is supplied from the optical path difference detector 20 to the current controller 24, for the purpose of reconciling a true value with a nominal value, the current controller 24 turns on some (for example, only k1 and k2) of the plurality of terminals for turning on electricity to partially heat the structure 10. Thus, even though expansion and contraction of the structure 10 in a longitudinal direction is not uniform due to gravity or external force from a supporting framework, each of which acts upon the structure 10, a true value can be reconciled with a nominal value by uniformly correcting the expansion and contraction in a longitudinal direction.

The electrical resistor 14 can have an arbitrary configuration. The electrical resistors 14 are uniformly formed at an inner wall of the closed hollow section similarly to FIG. 1. Further, a plurality of terminals for turning on electricity are connected to arbitrary parts of the electrical resistors 14, and the electrical resistors are partially turned on so that they can be heated.

Further, in the embodiment mentioned above, by further providing a temperature detector for detecting a temperature of the structure 10, current to be supplied to the electrical resistors 14 can be controlled based on the temperature detected.

Figure 5:
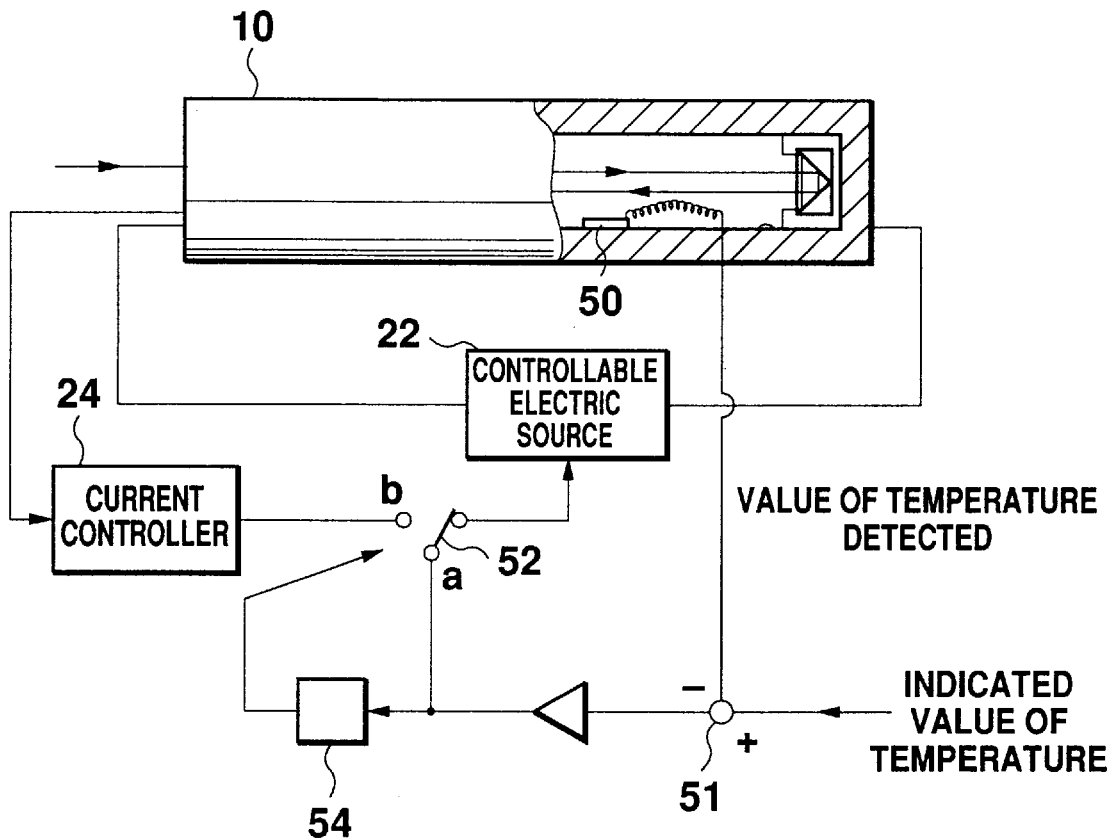
FIG. 5 is a block diagram showing the constitution for performing temperature control of the length measuring machine.

FIG. 5 shows the constitution for such a case where a true value is reconciled with a nominal value using a temperature detector. The temperature detector 50 is provided at an inner wall of the closed hollow section and outputs data about a temperature of the inner wall after detecting the temperature. Current is then supplied from the controllable electrical source 22 to the electrical resistor 14 and it is set so that the temperature detected can be a value within a prescribed range. Then, by supplying under such conditions laser beams having a wave length such that a detection signal of the light wave interferometer can have a phase difference within a range of one wave length, it is arranged so that a difference between a true value and a nominal value in a length of the section of the graduations 12 can be within a range of one wave length.

Specifically, in the constitution shown in FIG. 5, a subtracter 51 computes a difference between an indicated value of temperature to indicate a temperature within a prescribed range and a value of temperature detected, and supplies a signal representing the difference to a threshold detecting circuit 54 after amplifying it. The threshold detecting circuit 54 determines whether or not the difference between the indicated value of temperature and the value of temperature detected is at or above an allowable threshold. If the difference is at or above the threshold, in other words, if the temperature detected is not in a prescribed range, a switch 52 is switched to the side of contact "a" and a value of difference between the two values of temperature is supplied to the controllable electrical source 22. The controllable electrical source 22 supplies current corresponding to the value of difference between the two values of temperature to the electrical resistor 14, and the electrical resistor 14 is heated until the two values of temperature nearly coincide.

If the threshold detecting circuit 54 determines that the difference between the two values of temperature is less than the allowable threshold, in other words, if a temperature of the inner wall of the closed hollow section is within a prescribed range, laser beams having a wave length such that a difference between a true value and a nominal value is within a range of one wave length will be introduced to the light wave interferometer. Also, the switch 52 will be switched to the side of contact "b" and the electrical resistor 14 is heated so as to reconcile the true value with the nominal value. Thus, the true value can be reconciled with the nominal value with a higher accuracy and highly precise length measurement can be achieved regardless of a working environment.

Further, in the embodiment described above, a laser diode provided in the closed hollow section is used as a laser beam source. However, the present invention is not limited to this aspect, whereby it is also possible to use laser beams from a laser beam source provided outside the closed hollow section.

Figure 6:
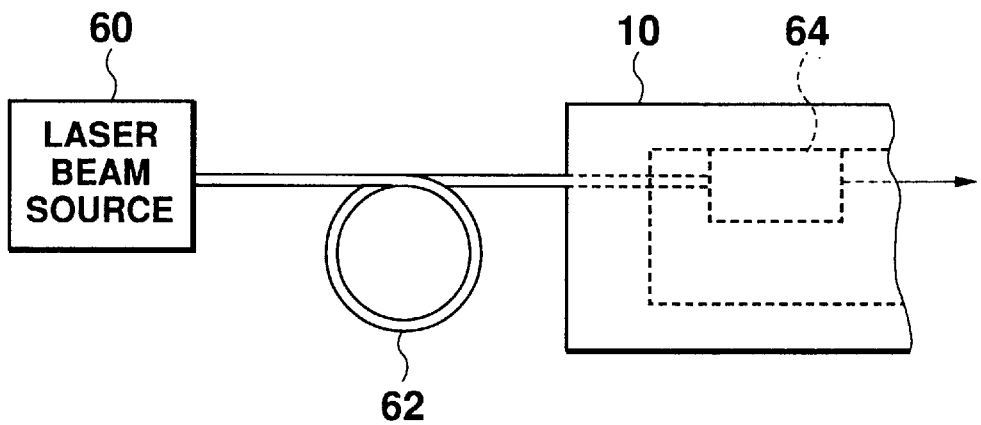
FIG. 6 is an explanatory view showing an arrangement of the laser beam source.

FIG. 6 shows a constitution in which laser beams injected from a laser beam source 60 provided outside the structure 10 are led into the light wave interferometer in the closed hollow section using an optical fiber 62. The laser beams led into the closed hollow section via the optical fiber 62 enter into a collimation light source 64, and then enter into the beam splitter 16 of the light wave interferometer after becoming parallel rays.

Figure 7:
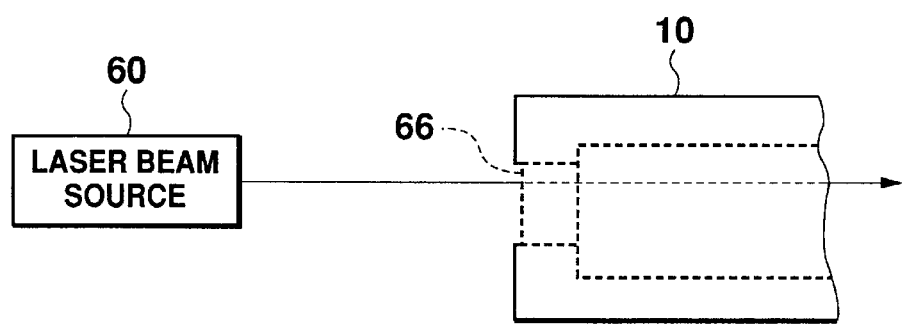
FIG. 7 is an explanatory view showing another arrangement of the laser beam source.

On the other hand, FIG. 7 shows another example of using an outside light source. On one side of the structure 10, a transparent window which is permeable by laser beams is formed, and laser beams from the laser beam source 60 are led into the light wave interferometer in the closed hollow section from the transparent window 66.

In each of the cases described above, it is preferable to use single mode laser beams in terms of length measuring precision of the light wave interferometer.

Further, as a length measuring method of the length measuring machine in the light wave interferometer, it is also preferable to use an optical heterodyne interference method capable of highly accurate detection as well as the homodyne method described above. In the heterodyne interference method, by changing a phase of reference beams with a certain rate of change to the phase of signal beams, temporal carriers are generated and by changing the respective frequencies of beams which are led to a reference branch or a signal branch, a phase difference between these two branches is rendered to be a function of time whose unit is a beat angle frequency. Thus, measurement of the phase difference can be carried out not by detection of strength which is adopted in the homodyne method, but by detection of time difference, whereby a general purpose measuring instrument, such as a time counter, can be used. This makes it possible to more accurately measure a length of the section of the graduations 12 of the structure 10 and a quantity of expansion and contraction.

Further, in this embodiment, as a method of controlling a temperature of the structure 10, heating by the electrical resistor and cooling by a refrigerant are shown. However, an optional method of changing the temperature of the structure 10 can be used. All of these methods are within the technical scope of the present invention.

Second Embodiment

Figure 8:
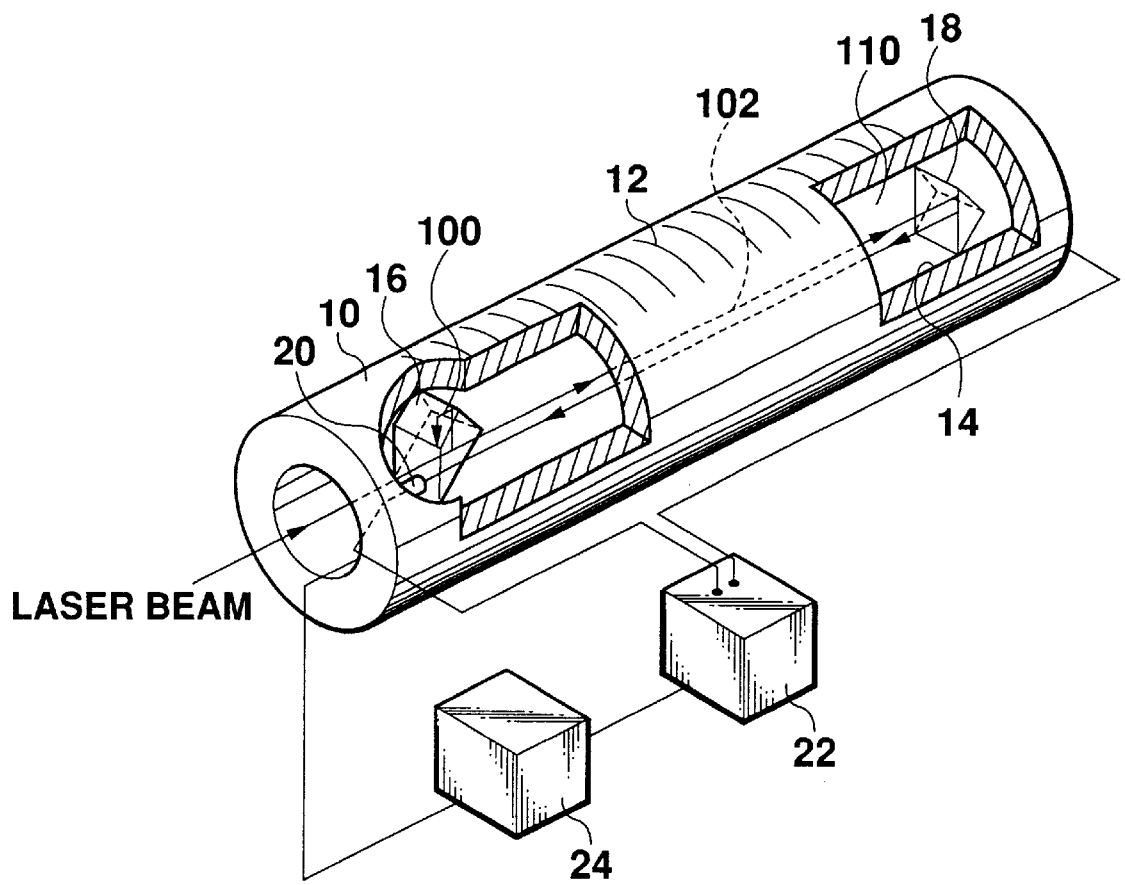
FIG. 8 is a perspective view showing a length measuring machine according to a second embodiment of the present invention.

FIG. 8 is a perspective view showing a length measuring machine using laser beams according to a second embodiment. This length measuring machine brings about uniform thermal expansion in a longitudinal direction and is composed of a structure 10 containing a substance 110 which has a uniform refractive index and is permeable by laser beams. At an exterior wall of the structure 10, graduations 12 are marked in a longitudinal direction. The configuration of the substance is not important as long as it is permeable by laser beams. However, in this embodiment, a solid substance, for example, glass, plastic, quartz, crystal, or silicon dioxide is used.

Further, in the structure 10, electrical resistors 14 which uniformly generate heat in a longitudinal direction in response to applied current are sequentially formed and also a light wave interferometer is provided for measuring a length of a section of graduations 12 marked at an exterior wall of the structure 10. The light wave interferometer is composed of a beam splitter 16 for separating an optical path of incident laser beams into a reference branch optical path 100 and a signal branch optical path 102; a corner cube 18 for reflecting the signal branch optical path 102; and an optical path difference detector 20 for detecting an optical path difference of the reference branch optical path 100 and the signal branch optical path 102. These optical paths are filled with substances 110 which are permeable by laser beams and have a uniform refractive index. Further, a controllable electrical source 22 and a current controller 24 for supplying current to the electrical resistors 14 are provided outside the structure 10.

Incidentally, the structure 10 can be composed of single crystal silicon or the like, for example, and can be formed by applying deep hole processing (gun drill, grinding or the like) to a lengthy single crystal silicon substance. Further, the electrical resistor 14 can be formed by evaporation, sputtering, or the like of a metal such as tungsten, for example.

Further, the electrical resistor 14 can be formed not only inside the structure 10, but also at an external wall similarly to the graduations 12. The electrical resistor 14, the controllable electrical source 22 and the current controller 24 function as temperature control means.

Figure 9:
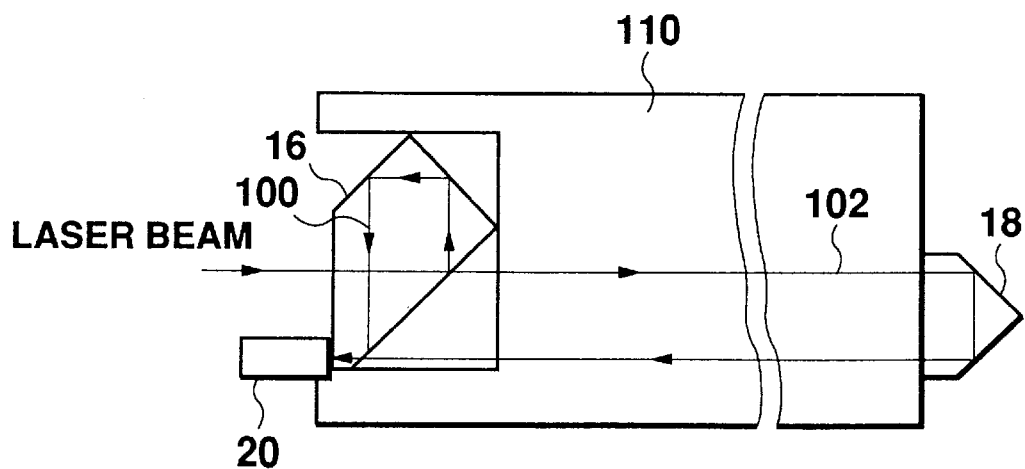
FIG. 9 is a block diagram of the light wave interferometer of FIG. 8.

FIG. 9 shows the constitution of the light wave interferometer to be provided in the structure 10. Incident laser beams enter into the beam splitter 16 and are separated into two groups on a surface of the beam splitter 16. One group advances along the reference branch optical path 100, while the other advances along the signal branch optical path 102. The group advancing along the reference branch optical path 100 repeats reflection in the beam splitter 16 and enters into the optical path difference detector 20. On the other hand, the group advancing along the signal branch optical path 102 penetrates through the beam splitter 16 and then enters into the corner cube 18. Subsequently, the group is reflected at the corner cube 18, enters into the beam splitter 16 again, and enters into the optical path difference detector 20.

Here, the beam splitter 16 is provided at a location which corresponds to one end of the graduations 12 marked at an external wall of the structure 10. On the other hand, the corner cube 18 is provided at a location which corresponds to the other end of the graduations 12. Thus, an optical path difference between the reference branch optical path 100 and the signal branch optical path 102 corresponds to an interval between one end and the other end of the graduations 12. Further, the beam splitter 16 and the corner cube 18 adhere to the substance 110, respectively. Matching oil or the like is applied to an adhesion part, so that reflection or damping of laser beams will not arise. Consequently, there is hardly any fluctuation of refractive index on the reference branch optical path 100 and the signal branch optical path 102, and by detecting an optical path difference between the reference branch optical path 100 and the signal branch optical path 102 using the optical path difference detector 20, it is possible to securely measure an interval between one end and the other end of the graduations 12, namely, a true value of the length of the section on which the graduations 12 are marked.

If a phase difference between the two optical paths is detected as strength of interference beam, for example, using a homodyne method, an optical path difference can be detected.

The length measuring machine according to this embodiment has the constitution described above and functions as follows. More specifically, first, a length of the part on which the graduations 12 are marked is measured by the optical path difference detector 20 of the light wave interferometer provided in the structure 10. It goes without saying that in order to measure an optical path difference, laser beams used must have a wave length within a range of one wave length of a phase difference to be detected by the optical path difference detector 20. Also, a measured value (specifically, data about an optical path difference between the reference branch optical path 100 and the signal branch optical path 102) is supplied from the optical path difference detector 20 to the current controller 24, so that a difference between a nominal value of the length measuring machine and the measured value is computed. This difference is caused by an influence of a change with the passage of time or a working environment (expansion and contraction of a medium resulting from a fluctuation of temperature). In order to eliminate the difference between the nominal value and a true value, the current controller 24 supplies a control signal to the controllable electrical source 22, and current corresponding to the extent of the difference is supplied to the electrical resistor 14 to uniformly heat the structure 10 in a longitudinal direction.

As described above, even though the structure expands and contracts due to the influence of a change with the passage of time or a working environment, a degree of the expansion and contraction can be precisely measured and a length of the section of the graduations 12 of the structure 10 can be reconciled with the nominal value, thereby enabling highly precise length measurement.

In the above description, a case in which a true value is reconciled with a nominal value by supplying current to the electrical resistor 14 to cause thermal expansion of the structure 10 is shown. However, since the major point of the present invention is to reconcile a true value with a nominal value by controlling a temperature of the structure 10, such a reconciliation can also be achieved by cooling the structure 10 using cold water, low temperature gas, or the like other than by heating the structure 10. Specifically, if a nominal value is larger than a true value, thermal expansion will be applied, and if the true value is larger than the nominal value, expansion and contraction by cooling will be applied.

Third Embodiment

Figure 10:
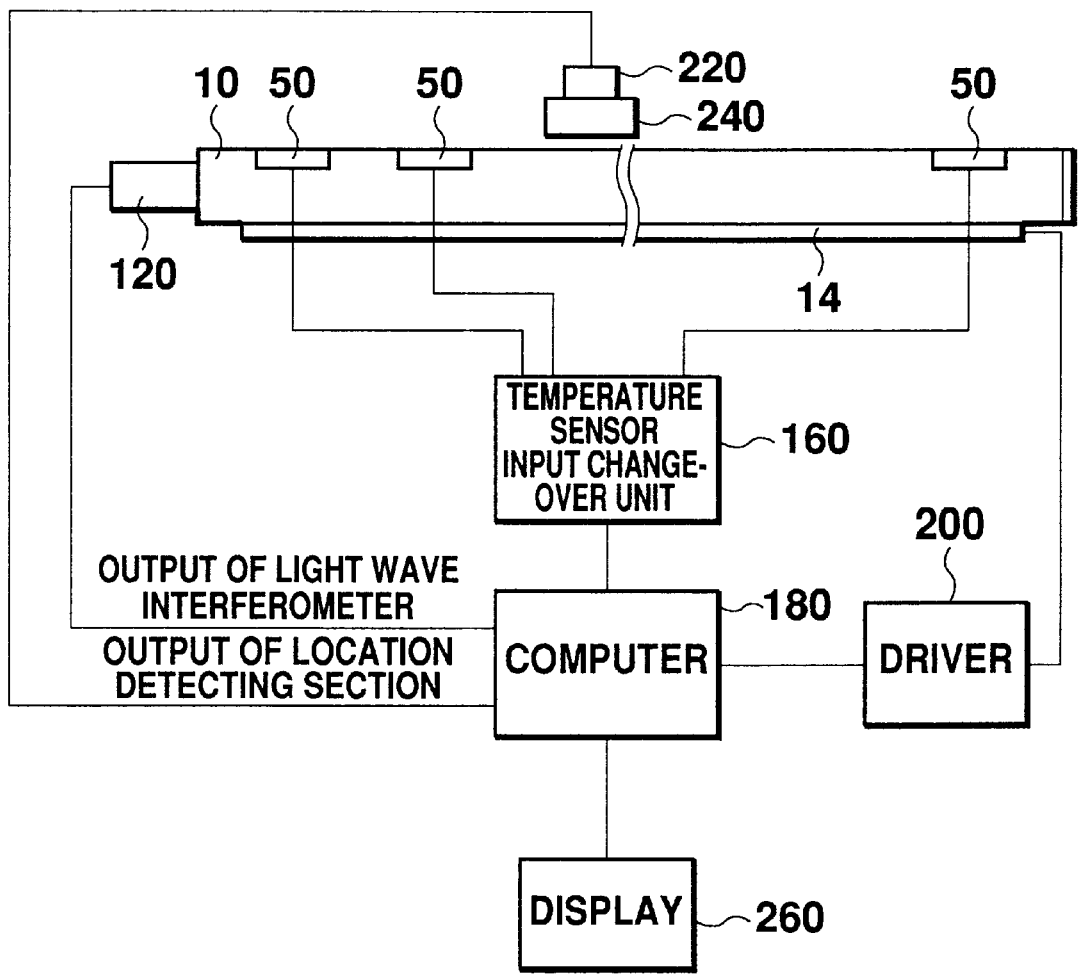
FIG. 10 is a block diagram showing the overall constitution according to a third embodiment of the present invention.

FIG. 10 is a conceptual block diagram of a third embodiment. As a body of a length measuring machine, a structure 10 made of quartz glass or the like is provided, and a light wave interferometer 120 for detecting a length of the structure 10 is also provided. An output of the light wave interferometer 120, namely, data about the length of the structure 10 is supplied to a computer 180 provided outside the length measuring machine.

Further, a plurality of temperature sensors 50 are arranged at the structure 10, and a temperature distribution of the structure 10 is detected. As will be described later, to be exact, the temperature sensors 50 are arranged at a section of graduations provided on the structure 10 and detect a temperature distribution of the section of graduations. The respective temperature data detected by the plurality of temperature sensors 50 are inputted to a temperature sensor input changeover unit 160 and then supplied to the computer 180 as temperature distribution data.

Further, at the structure 10, an electrical resistor 14 for causing thermal expansion of the structure 10 is provided, and current is supplied to the electrical resistor 14 from a driver 200. The driver 200 is driven in response to a control signal transmitted from the computer 180. In other words, the electrical resistor 14, driver 200, and the computer 180 function as temperature control means.

Further, a location detecting section 220 and a slider 240 are provided in such a manner that they are face to face with the structure 10. The graduations provided at the structure are read, in other words, a location from the origin is detected, using any one of various detecting methods, such as a photoelectric method, an electrostatic capacitance method, or a magnetic method, and the result of detection is supplied to the computer 180.

In response to a detection signal from the light wave interferometer 120, the computer 180 outputs a control signal to the driver 200 in order for a length of the structure 10 to be a prescribed value, and supplies current to the electrical resistor 14 to cause thermal expansion of the structure 10. Further, the location, which is detected by the location detecting section 220, is corrected based on a temperature distribution of the section of graduations of the structure 10 and therefore a precise location is computed. The result of location detection computed is supplied to a display unit 260 and displayed thereon.

Figure 11:
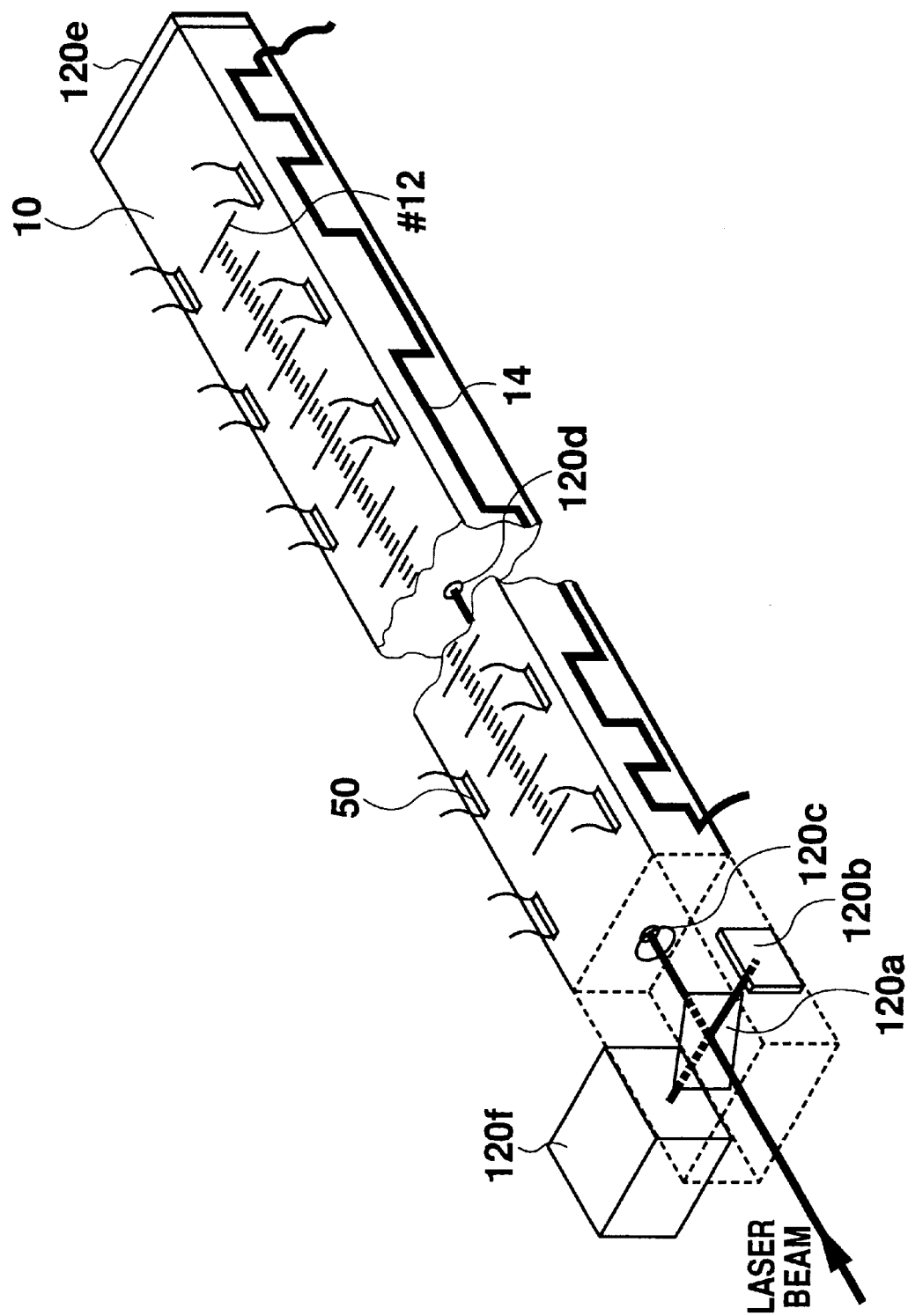
FIG. 11 is a perspective view showing the length measuring machine of FIG. 10.

FIG. 11 is a perspective view showing a section of the length measuring machine of FIG. 10. At an external wall of the structure 10, the graduations 12 are provided in a longitudinal direction. Further, as described above, a plurality of temperature sensors 50 are provided so as to detect a temperature of the section on which the graduations 12 are marked. In FIG. 11, these temperature sensors 50 are arranged on both sides of the graduations 12, respectively. Further, the light wave interferometer 120 is provided in such a manner that its optical path is located inside the structure 10, and its composition is as follows.

The light wave interferometer 120 comprises a beam splitter 120*a*, fixed at one end of the structure 10, for transmitting and reflecting light in an orthogonal direction, a reference surface reflector 120*b* for letting laser beams reflected at the beam splitter 120*a* reflect, a lens 120*c* for converging laser beams which have passed through the beam splitter 120*a*, an optical fiber 120*d* for carrying laser beams, a detection surface reflector 120*e*, provided at a trailing end of the structure 10, for reflecting laser beams, and an optical path difference detector 120*f* for detecting an optical difference between an incident laser beam (reference branch beam) which was reflected at the reference surface reflector 120*b* and an incident laser beam (signal branch beam) which was reflected at the detection surface reflector 120*e*.

Figure 12:
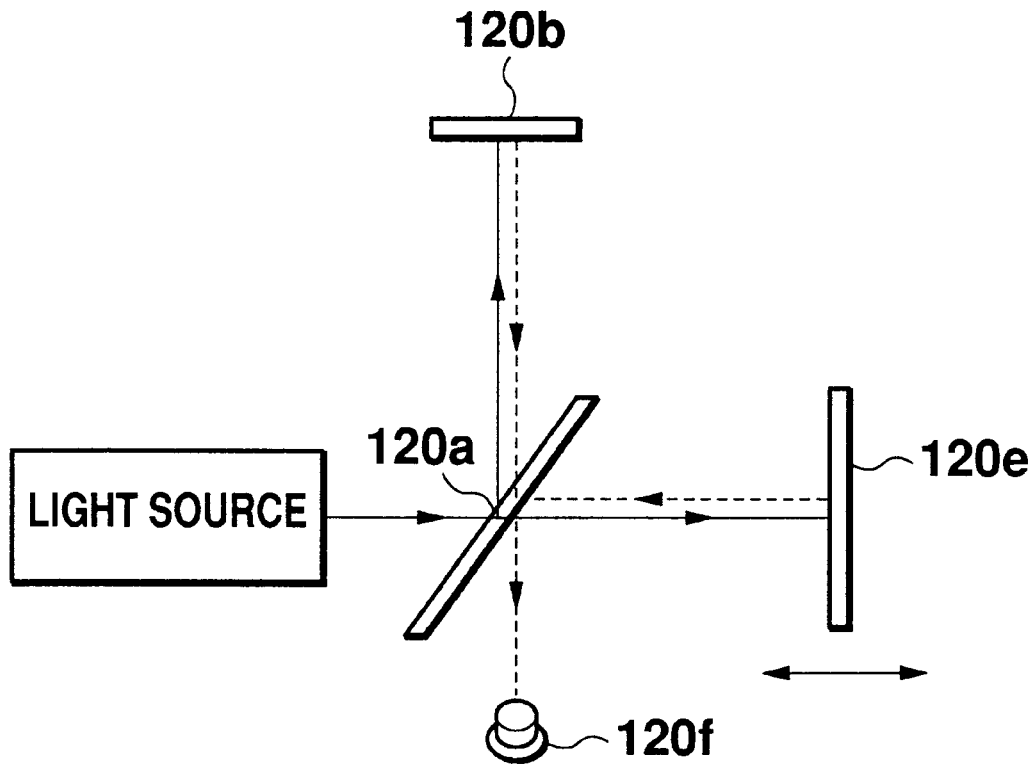
FIG. 12 is an explanatory view showing a principle of the light wave interferometer of FIG. 10.

FIG. 12 is a principle view of the light wave interferometer 120 shown in FIG. 11. This is a so-called Michelson interferometer. Some laser beams from a beam source reflect in an orthogonal direction by the beam splitter 120*a*, and are again reflected by the reference surface reflector (fixed mirror) 120*b*, thereby returning toward the beam splitter 120*a*. These return beams then enter into an optical path difference detector (photodetector) 120*f*. On the other hand, the remaining laser beams pass through the beam splitter 120*a*, reflect by the detection surface reflector (mobile mirror) 120*e*, reflect at the beam splitter 120*a* in an orthogonal direction, and similarly enter into the optical path difference detector 120*f*. These laser beams, both of which enter into the optical path difference detector 120*f*, pass different optical paths, respectively. Thus, interference arises according to the optical path difference. In other words, every time the optical path difference changes by integer times as much as a half of the laser beam length, interference beams repeat strength and weakness. Therefore, by converting the strength and weakness of the laser beams into electrical signals, movement of the detection surface reflector (mobile mirror) 120*e* can be detected as electrical signals, whereby an interval between a reference location (origin) and the detection surface reflector (mobile mirror) 120*e*, namely, a length of the structure in a longitudinal direction, can be detected.

Figure 13:
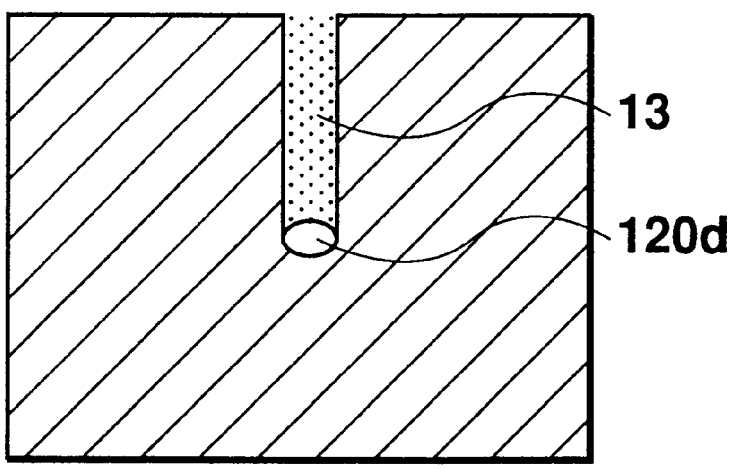
FIG. 13 is a sectional view showing the length measuring machine of FIG. 10.

On the other hand, FIG. 13 is a sectional view of the structure 10. A groove is formed at the structure 10, and the optical fiber 120*d* described above is embedded in the groove in such a manner that the optical fiber 120*d* is located almost at the center of the structure 10. Further, the structure 10 and the optical fiber 120d are firmly adhered to each other by an adhesive 13 so that they can expand and contract as one body at the time of temperature change. A pencil of laser beams having a diameter of 2 to 5 mm is generally used in the light wave interferometer 120, and therefore a core diameter of the optical fiber 120d is set to be approximately 10 to 50 µm. The optical fiber 120d is used for propagating laser beams without loss and is generally called a light wave guide path.

Constitution of the location detector using the length measuring machine according to this embodiment is as described above. Operation of the location detector will subsequently be described.

First, the light wave interferometer 120 detects a length of the structure which is a main body of the length measuring machine and supplies a result of the detection to the computer 180. The computer 180 compares the length of the structure 10 detected with a prescribed value (specified length under a reference temperature), and outputs a control signal to the driver 200 so that the length of the structure 10 becomes the prescribed value. The driver 200 supplies current to the electrical resistor 14 in response to the control signal, so that the structure 10 is evenly heated for the most part.

After the length of the structure 10 becomes the prescribed value by heating the structure 10, the computer 180 further corrects respective intervals between graduations 12 provided at the structure 10 based on the data about a temperature distribution from the temperature sensor input changeover unit 160.

Figure 14:
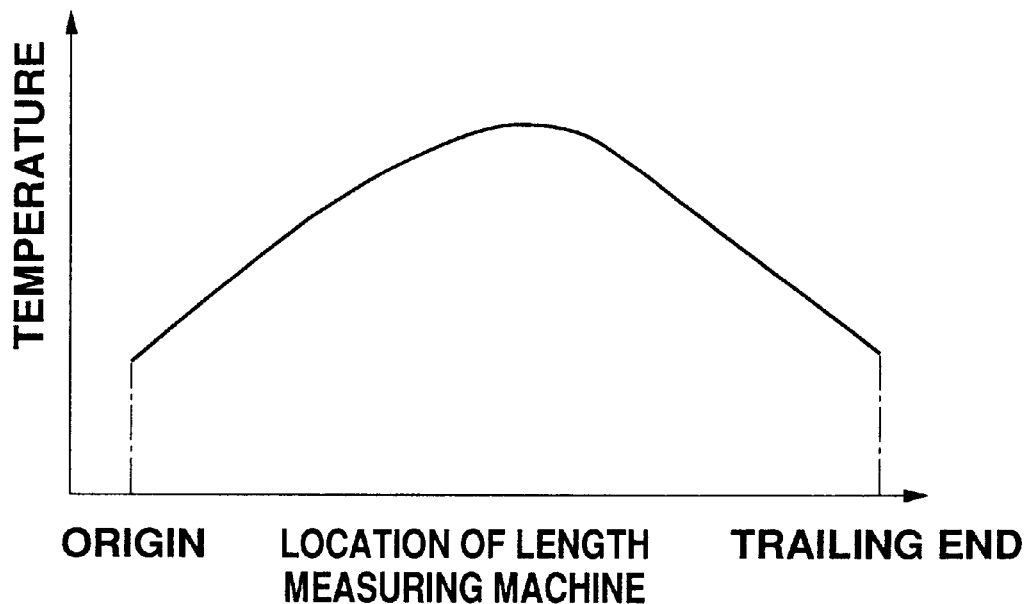
FIG. 14 is a graph showing a temperature distribution of a structure.

FIG. 14 shows an example of temperature distributions of the section of the graduations 12 to be detected by a plurality of temperature sensors 50 and supplied to the computer 180. In this figure, the axis of abscissas represents a location of the length measuring machine (location of a graduation from the origin), whereas the axis of ordinates represents a temperature detected by the temperature sensor 50. In this example, as shown in the figure, the temperature distribution is such that the temperature is high at the center of the graduations and low at both edges (the temperature distribution will be scattered due to a limited number of temperature sensors, but in this figure, a sequential distribution is shown using a Bezier curve or the like).

In the case that a plurality of temperature sensors 50 are arranged on both sides of graduations 12 like this embodiment (see FIG. 11), temperature distributions on both side are detected. Thus, an average value of both sides to be computed becomes the temperature distribution of the section of graduations 12.

The computer 180 calculates a quantity of correction of respective intervals between graduations based on such a temperature distribution. The quantity of correction of respective intervals between graduations can be found by multiplying a detected temperature distribution by a coefficient of linear expansion of the length measuring machine (structure 10). Specifically, supposing an interval between graduations under a reference temperature (for example, 20° C.) is L, a coefficient of linear expansion is α, and a temperature distribution value detected is t, a fluctuation of the interval between graduations ΔL will be:

$$\Delta L = (t-20) \times \alpha \times L \tag{1}$$

Here, since the length of the structure 10 has already been controlled to be a prescribed value by heating using the electrical resistor 14, for example, in the case of an incremental length measuring machine, an integrated value of all the graduations of the length measuring machine (namely, a length of the length measuring machine from the origin to the trailing end) coincides with the graduations. Thus, offsetting is applied in order for an integrated value of ΔL to be zero. In other words, if offset is c, offset c will be calculated so as to have an equation:

$$\Sigma(\Delta L + c) = 0 \tag{2}$$

The significance of this offset c is to eliminate a temperature measurement error and a coefficient error of linear expansion.

Figure 15:
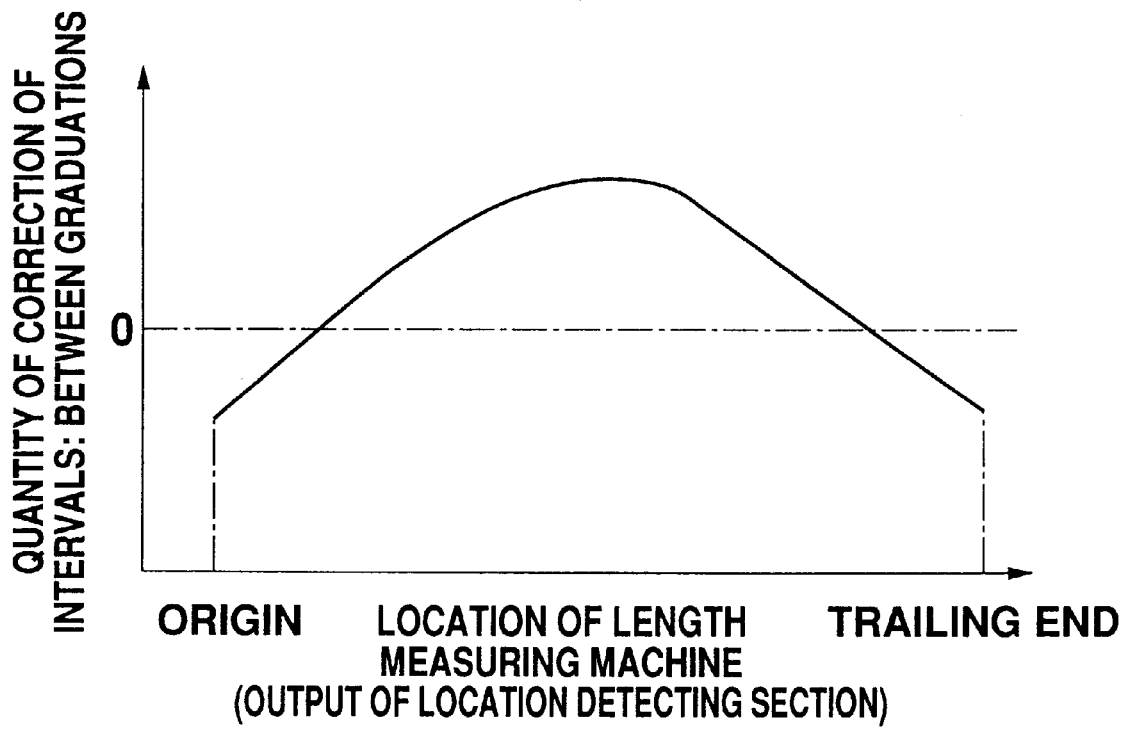
FIG. 15 is a graph showing an extent of correction of the graduation intervals.

FIG. 15 exemplifies a quantity of correction of respective intervals between graduations computed in the manner described above. In this figure, the axis of abscissas represents a location of the length measuring machine, whereas the axis of ordinates represents a quantity of correction of respective intervals between graduations. In this graph, to be specific, ΔL corresponding to each location of the length measuring machine is found by the equation (1). If the offset c found by the equation (2) is negative, the ΔL curve will be shifted down (in a "−" direction). If the offset c is positive, the ΔL curve will be shifted up (in a "+" direction). Thus, the quantity of correction of respective intervals between graduations can be found.

In the case of the incremental length measuring machine, for example, after computing the quantity of correction of respective intervals between graduations, every time the location detecting section 220 reads each of the graduations, an interval between graduations corrected by a correction curve of the interval between graduations is computed. Each interval between graduations is then added up. Thus, an accurate present location after the temperature distribution is corrected can be computed.

Figure 16:
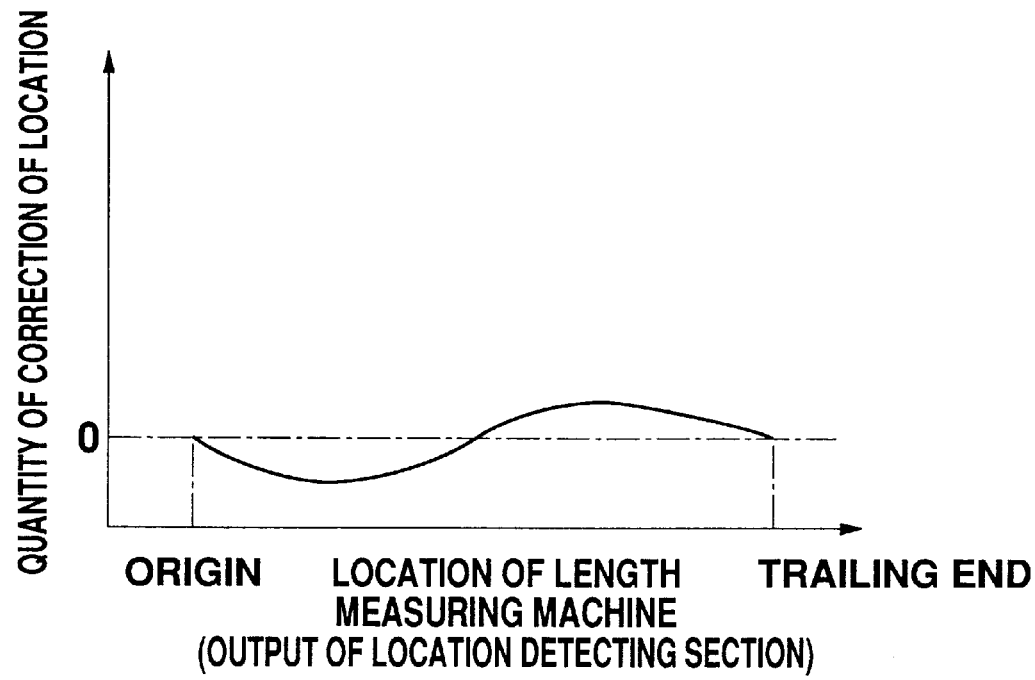
FIG. 16 is a graph showing an extent of correction of location.

On the other hand, FIG. 16 shows an extent of correction of location in the case of an absolute length measuring machine. In this figure, the axis of abscissas represents a location of the length measuring machine, whereas the axis of ordinates represents a quantity of correction of location. This extent of correction of location is computed by finding an integrated value from the origin of the quantity of correction of respective intervals between graduations to a location of the length measuring machine as shown in FIG. 15 and plotting the location of the length measuring machine. It should be noted that in FIG. 15, an extent of correction of respective intervals between graduations becomes a positive or negative value depending on a location of the length measuring machine, but a quantity of correction of location shown in FIG. 16 is an integrated quantity of FIG. 5, which is zero at the origin, the trailing point, and near the center. By multiplying a location detected by the location detecting section 22 by the integrated extent of correction of location, an accurate present location after the temperature distribution is corrected can be computed.

In FIG. 16, an extent of correction is zero at the trailing end. This is because correction is not required at the trailing end. More specifically, as described above, the computer 180 has previously controlled a length of the structure 10 to be a prescribed value using the electrical resistor 14. Thus, a length of the length measuring machine from the origin to the trailing end coincides with the graduations.

As described above, in this embodiment, after controlling a length of the structure 10 to be a prescribed value, a variation of the interval between graduations is corrected based on the temperature distribution. Thus, it is possible to carry out an accurate measurement of length (or detection of location) without being influenced by fluctuations of air or changes of temperature.

Further, in this embodiment, by measuring a refractive index of an interference optical path of the light wave interferometer 120 or correcting a light source wave length using a precision barometer, hygrometer, and thermometer, more precise length measurement can be performed. Further, it is also preferable to use a temperature of the interference optical path measured as a reference temperature at the time of correcting the interval between graduations, not a fixed reference value, such as 20° C. used in the equation (1).

Figure 17:
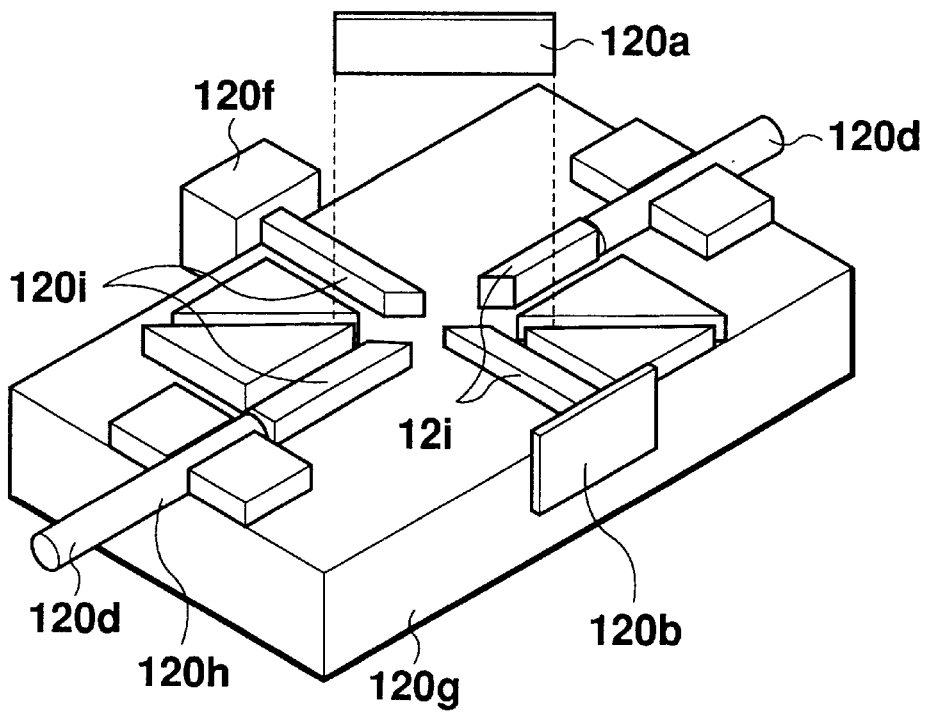
FIG. 17 is a perspective view showing another constitution of the light wave interferometer of FIG. 10.

FIG. 17 shows another constitution of the light wave interferometer 120. In the embodiment described above (see FIG. 11), the optical path from the reference surface reflector to the optical path difference detector via the beam splitter is in the air. However, in this embodiment, a light wave guide path which is formed by a chemical vapor deposition (CVD) or the like on the silicon substrate 120 is used. Laser beams enter through the optical fiber 120d (on the left side of the figure) arranged in a guide groove 120h, advance inside an angular type light wave guide path 120I, and are separated by the beam splitter 120a into beams which continue going straight on and beams which reflect in an orthogonal direction. The beams which make a straight ahead enter into the optical fiber 120d halfway. This optical fiber 120d can be the optical fiber 120d in the structure 10 of FIG. 11 just as it is or another optical fiber can be connected halfway. An optical path from the reference surface reflector 120b to the optical path difference detector 120f via the beam splitter 120a is also light wave guide path 120i.

By having such a constitution, the light wave interferometer 120 according to this embodiment can be smaller and control fluctuations, such as fluctuations of air, more effectively than that of the embodiment described above. Incidentally, for a light wave guide path on a silicon substrate, not only such a constitution, but also an optional constitution can be adopted.

Figure 18:
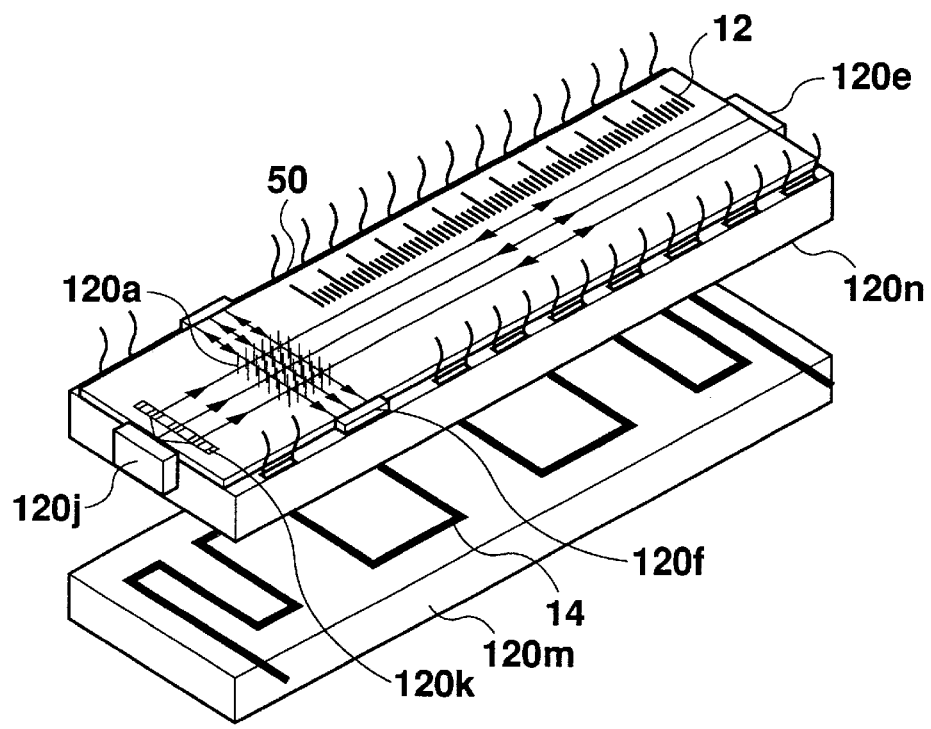
FIG. 18 is a perspective view showing yet another constitution of the light wave interferometer of FIG. 10.

FIG. 18 shows yet another constitution of the light wave interferometer 120. A semiconductor light source 120j is fixed at an end surface of the structure 10. Laser beams injected from the semiconductor light source 120j are converted into parallel rays by a light wave guide path lens 120k, such as a mode index lens, and the optical path bifurcates at the lattice type beam splitter 120a, whereby the laser beams are separated into two groups. These two groups of beams pass inside a light wave guide plate path provided in the form of a film on a surface of an upper substrate 120n, and these interfering beams enter into the optical path difference detector 120f.

On the other hand, an electrical resistor 14 is provided on a surface of a lower substrate 120m. The upper substrate 120n and the lower substrate 120m are adhered to each other. Thus, the electrical resistor 14 for heating the structure 10 is located inside the structure 10, whereby a heat distribution of the structure 10 becomes more uniform. This enables effective control of the effects of change in temperature.

In this embodiment, it will be sufficient if a length of the structure 10 of the length measuring machine is first set to be a prescribed value and then a temperature distribution of the section of graduations is corrected. Thus, as described above, not only thermal expansion by the electrical resistor 14 but also expansion and contraction by cooling is a method of controlling a length of the structure 10 of the length measuring machine to be a prescribed value. In other words, as temperature control means, cooling means can be used as well as heating means. In order to cool the structure 10, for example, cold water, cold gas, or the like can be used.

What is claimed is:

1. A length measuring machine using laser beams comprising:
    a structure which brings about uniform thermal expansion in a longitudinal direction;
    graduations to be provided on a wall surface of said structure;
    a light wave interferometer, provided in said structure, for measuring a prescribed length including a part on which said graduations are provided; and
    temperature control means for changing a temperature of said structure so as to maintain a length measured by said light wave interferometer constant.

2. The length measuring machine according to claim 1, wherein said structure has a closed hollow section which is decompressed almost to a vacuum, and said light wave interferometer is installed at the hollow section.

3. The length measuring machine according to claim 1, wherein said structure contains a substance which has a uniform refractive index and is permeable by laser beams advancing along a measurement optical path of said light wave interferometer.

4. The length measuring machine according to claim 1, wherein said temperature control means comprises:
    an electrical resistor which is provided in a longitudinal direction of said structure and generates heat in response to applied current; and
    current supply means for supplying current to said electrical resistor.

5. The length measuring machine according to claim 4, wherein a plurality of terminals for turning on electricity are connected with said electrical resistor in a longitudinal direction of said structure, and said current supply means supplies current to said electrical resistor via said plurality of terminals for turning on electricity in order for expansion and contraction of said structure in a longitudinal direction to be uniform.

6. The length measuring machine according to claim 1, said machine further comprising:
    temperature detecting means for detecting a temperature of said structure.

7. The length measuring machine according to claim 6, wherein said laser beams have a wave length such that a difference between a length measured by said light wave interferometer and a nominal value becomes a phase difference within one wave length when a temperature of said structure detected by said temperature detecting means is within a prescribed range.

8. The length measuring machine according to claim 1, wherein said light wave interferometer comprises:
    a beam splitter fixed to one end of said graduations;
    a reference surface reflector fixed relative to said beam splitter;
    a detection surface reflector fixed to the other end of said graduations; and
    an optical path difference detector for detecting an optical path difference between reference branch beams on a reference surface side and signal branch beams on a detection surface side, and said temperature control means control a temperature based on an optical path difference detected by said optical path difference detector.

9. The length measuring machine according to claim 8, wherein said light wave interferometer comprises:
    a semiconductor light source which injects said laser beams having a stabilized wave length;

isolators arranged between said light source and said beam splitter and between said beam splitter and said detection surface reflector; and a gas cell, arranged between said beam splitter and said optical path difference detecting means, for stabilizing a wave length.

10. The length measuring machine according to claim 1, wherein said laser beams are supplied to said light wave interferometer of said structure via an optical fiber.

11. The length measuring machine according to claim 1, wherein said laser beams are supplied to said light wave interferometer via a transparent window formed on an end surface of said structure.

12. The length measuring machine according to claim 1, wherein said laser beams are of a single mode.

13. The length measuring machine according to claim 1, wherein said light wave interferometer uses a light heterodyne interference method.

14. The length measuring machine according to claim 1, wherein said structure is a single crystal.

15. The length measuring machine according to claim 6, said machine further comprising:

computing means for correcting an interval between said graduations based on a temperature distribution of said structure which is detected by said temperature detecting means.

16. A method of determining a nominal value in a length measuring method using laser beams, wherein a laser beam length measuring machine comprises:

a structure which brings about uniform thermal expansion in a longitudinal direction;

graduations to be provided on a wall surface of said structure;

a light wave interferometer, provided in said structure, for measuring a prescribed length including a part on which said graduations are provided; and temperature control means for changing a temperature of said structure so as to maintain a length measured by said light wave interferometer constant, and said method of determining a nominal value comprising the steps of:

placing said structure in a prescribed temperature environment;

adjusting a value of temperature of said structure detected to be within a tolerance of said prescribed value;

actuating said temperature control means; and determining a nominal value to be kept for maintaining said length measured by said light wave interferometer constant.

17. The method of determining a nominal value according to claim 16, wherein said laser beam length measuring machine further comprises:

temperature detecting means for detecting a temperature of said structure.

* * * * *